United States Patent
Telefus (10) Patent No.: US 8,040,117 B2
(45) Date of Patent: Oct. 18, 2011

(54) CLOSED LOOP NEGATIVE FEEDBACK SYSTEM WITH LOW FREQUENCY MODULATED GAIN

(75) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 344 days.

(21) Appl. No.: 12/467,039

(22) Filed: May 15, 2009

(65) Prior Publication Data

US 2010/0289466 A1  Nov. 18, 2010

(51) Int. Cl.
*G05F 1/40* (2006.01)
(52) U.S. Cl. .................................. 323/271; 323/282
(58) Field of Classification Search .................. 323/271, 323/272, 282, 283, 284, 288, 351
See application file for complete search history.

(56) References Cited

U.S. PATENT DOCUMENTS

| | | | |
|---|---|---|---|
| 4,051,425 A | 9/1977 | Smith | 363/86 |
| 4,273,406 A | 6/1981 | Okagami | |
| 4,563,731 A | 1/1986 | Sato et al. | |
| 4,645,278 A | 2/1987 | Yevak et al. | 339/17 T |
| 4,695,933 A | 9/1987 | Nguyen et al. | |
| 4,712,160 A | 12/1987 | Sato et al. | 361/388 |
| 4,788,626 A | 11/1988 | Neidig et al. | 361/386 |
| 4,806,110 A | 2/1989 | Lindeman | 439/108 |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | 363/26 |
| 4,899,256 A | 2/1990 | Sway-Tin | 361/386 |
| 4,975,821 A | 12/1990 | Lethellier | |
| 5,075,821 A | 12/1991 | McDonnal | |

(Continued)

FOREIGN PATENT DOCUMENTS

GB  2252208 A  7/1992

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Jessica Han
(74) *Attorney, Agent, or Firm* — Haverstock & Owens LLP (57) ABSTRACT

A power supply apparatus and method of regulating is provided. A clock generator circuit is configured for generating a clock signal at a predetermined frequency. An amplifier circuit is coupled with the clock generator circuit. The amplifier circuit includes a gain circuit coupled with the clock generator circuit. The amplifier circuit is configured to receive the clock signal at a switching element of the gain circuit. A controller circuit is configured for receiving a modulated error signal of the amplifier circuit and is configured for generating a pulse width modulated signal for controlling a duty cycle of the switching circuit. The switching circuit is configured for receiving the modulated error signal. The error signal is modulated using the clock signal to vary a gain value of the gain circuit according to the predetermined frequency. An output circuit is coupled with the switching circuit and is configured for generating a regulated voltage signal. The controller circuit uses the modulated error signal to substantially reduce harmonic distortion in a switching frequency of the switching circuit. Harmonic distortion in the switching circuit can be reduce by 10.0 db or greater.

48 Claims, 6 Drawing Sheets

U.S. PATENT DOCUMENTS

| | | | |
|---|---|---|---|
| 5,090,919 A | 2/1992 | Tsuji | 439/519 |
| 5,101,322 A | 3/1992 | Ghaem et al. | 361/386 |
| 5,132,890 A | 7/1992 | Blandino | |
| 5,164,657 A | 11/1992 | Gulczynski | 323/275 |
| 5,235,491 A | 8/1993 | Weiss | 361/694 |
| 5,262,932 A | 11/1993 | Stanley et al. | 363/26 |
| 5,295,044 A | 3/1994 | Araki et al. | 361/709 |
| 5,365,403 A | 11/1994 | Vinciarelli et al. | 361/707 |
| 5,438,294 A | 8/1995 | Smith | |
| 5,490,052 A | 2/1996 | Yoshida et al. | |
| 5,565,761 A | 10/1996 | Hwang | 323/222 |
| 5,565,781 A | 10/1996 | Dauge | 324/403 |
| 5,592,128 A | 1/1997 | Hwang | 331/61 |
| 5,673,185 A | 9/1997 | Albach et al. | |
| 5,712,772 A | 1/1998 | Telefus et al. | 363/21 |
| 5,742,151 A | 4/1998 | Hwang | 323/222 |
| 5,747,977 A | 5/1998 | Hwang | 323/284 |
| 5,786,687 A | 7/1998 | Faulk | |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,838,554 A | 11/1998 | Lanni | 363/21 |
| 5,859,771 A | 1/1999 | Kniegl | |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | 323/272 |
| 5,923,543 A | 7/1999 | Choi | 363/21 |
| 6,058,026 A | 5/2000 | Rozman | |
| 6,069,803 A | 5/2000 | Cross | 363/21 |
| 6,091,233 A | 7/2000 | Hwang et al. | 232/222 |
| 6,091,611 A | 7/2000 | Lanni | |
| 6,160,725 A | 12/2000 | Jansen | 363/65 |
| 6,183,302 B1 | 2/2001 | Daikuhara et al. | 439/608 |
| 6,272,015 B1 | 8/2001 | Mangtani | 361/707 |
| 6,282,092 B1 | 8/2001 | Okamoto et al. | 361/704 |
| 6,323,627 B1 | 11/2001 | Schmiederer et al. | |
| 6,326,740 B1 | 12/2001 | Chang et al. | |
| 6,344,980 B1 | 2/2002 | Hwang et al. | |
| 6,366,483 B1 | 4/2002 | Ma et al. | |
| 6,388,897 B1 | 5/2002 | Ying et al. | |
| 6,390,854 B2 | 5/2002 | Yamamoto et al. | 439/620 |
| 6,396,277 B1 | 5/2002 | Fong et al. | 324/402 |
| 6,407,514 B1 | 6/2002 | Glaser et al. | 315/247 |
| 6,459,175 B1 | 10/2002 | Potega | 307/149 |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,487,095 B1 | 11/2002 | Malik et al. | |
| 6,531,854 B2 | 3/2003 | Hwang | 323/285 |
| 6,541,944 B2 | 4/2003 | Hwang | 323/225 |
| 6,549,409 B1 | 4/2003 | Saxelby et al. | 361/704 |
| 6,583,999 B1 | 6/2003 | Spindler et al. | |
| 6,605,930 B2 | 8/2003 | Hwang | 323/225 |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,775,162 B2 | 8/2004 | Mihai et al. | 363/141 |
| 6,919,715 B2 * | 7/2005 | Muratov et al. | 323/285 |
| 6,958,920 B2 | 10/2005 | Mednik et al. | 363/19 |
| 6,970,366 B2 | 11/2005 | Apeland et al. | |
| 7,035,126 B1 | 4/2006 | Lanni | |
| 7,038,406 B2 | 5/2006 | Wilson | |
| 7,047,059 B2 | 5/2006 | Avrin et al. | 600/409 |
| 7,064,497 B1 | 6/2006 | Hsieh | |
| 7,202,640 B2 * | 4/2007 | Morita | 323/205 |
| 7,208,833 B2 | 4/2007 | Nobori et al. | 257/704 |
| 7,212,420 B2 | 5/2007 | Liao | |
| 7,274,175 B2 | 9/2007 | Manolescu | |
| 7,286,376 B2 | 10/2007 | Yang | |
| 7,324,354 B2 | 1/2008 | Joshi et al. | |
| 7,386,286 B2 | 6/2008 | Petrovic et al. | |
| 7,450,388 B2 | 11/2008 | Beihoff et al. | |
| 7,499,301 B2 | 3/2009 | Beihoff et al. | |
| 7,545,256 B2 | 6/2009 | O'Toole et al. | |
| 7,570,497 B2 | 8/2009 | Jacques et al. | |
| 7,639,520 B1 | 12/2009 | Zansky et al. | |
| 7,701,305 B2 * | 4/2010 | Lin et al. | 331/143 |
| 7,764,515 B2 | 7/2010 | Jansen et al. | |
| 2002/0008963 A1 | 1/2002 | DiBene, II et al. | 361/720 |
| 2002/0011823 A1 | 1/2002 | Lee | 320/137 |
| 2003/0035303 A1 | 2/2003 | Balakrishnan et al. | 363/16 |
| 2004/0008532 A1 | 1/2004 | Asawa | |
| 2004/0228153 A1 | 11/2004 | Cao et al. | 363/71 |
| 2005/0024016 A1 | 2/2005 | Breen et al. | 320/128 |
| 2005/0105224 A1 | 5/2005 | Nishi | 361/18 |
| 2005/0117376 A1 | 6/2005 | Wilson | |
| 2005/0138437 A1 | 6/2005 | Allen et al. | 713/300 |
| 2005/0225257 A1 | 10/2005 | Green | |
| 2005/0281425 A1 | 12/2005 | Greuet et al. | 381/331 |
| 2006/0022637 A1 | 2/2006 | Wang et al. | 320/112 |
| 2006/0152947 A1 | 7/2006 | Baker et al. | |
| 2008/0191667 A1 | 8/2008 | Kernahan et al. | |
| 2010/0322441 A1 | 12/2010 | Weiss et al. | |

FOREIGN PATENT DOCUMENTS

| | | |
|---|---|---|
| JP | 4217869 A | 8/1992 |
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

EE Times.com—"Wireless Beacon Could Recharge Consumer Devices", by R. Colin Johnson, 3 pages, Nov. 6, 2007.

Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

Scollo, P. Fichera R., "Electronic Transformer for a 12V Halogen Lamp", Jan. 1999, ST Microelectronics pp. 1-4.

"Randomized Modulation in Power Electronic Converters", Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. Tse,et al. Member IEEE, IEEE Transactions on Power Electronics, vol. 15., No. 2, Mar. 2000, pp. 399-410.

Notification of Transmittal of the International Search Report and the Written Opinion of the International Searching Authority, or the Declaration; International Application No. PCT/US2009/065300, International Filing Date Nov. 20, 2009, 11 pages.

Notice of Allowance dated Sep. 17, 2010, U.S. Appl. No. 12/079,662, filed Mar. 27, 2008, 27 pages.

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

* cited by examiner

CLOSED LOOP NEGATIVE FEEDBACK SYSTEM WITH LOW FREQUENCY MODULATED GAIN

FIELD OF THE INVENTION

The present invention relates to the field of power supplies. More particularly, the present invention relates to a closed loop negative feedback system with low frequency modulated gain.

BACKGROUND

Every electrical device that connects with a power supply main is required not to pollute or transmit high frequency noise onto the main. The amount of electrical emission allowed by electrical devices is heavily regulated by the Federal Communications Commission (FCC). Conventional power supply designs have migrated to using higher operating frequencies since the higher operating frequencies allow a reduction in size of power supply components and allow a reduction is cost. The disadvantage of operating at higher frequencies is the increased production of high harmonics or electromagnetic interference (EMI).

Conventional methods of reducing EMI has been aimed at reducing a switching frequency of a switching circuit below standard EMI bandwidth limits of 150 Khz as set by the FCC. This approach has the disadvantage of increasing the size of magnetic components in a power supply. Other methods of reducing EMI have simply been to add additional filter components to reduce unwanted frequency harmonics. This second approach has the disadvantage of adding to the weigh, size and cost of power supplies. Another approach to reducing large spikes of harmonics or EMI is the use of a snubber. The snubber although effective in reducing EMI, compromises efficiency of a power converter. In yet another approach, EMI is reduced by using jitter that takes discrete harmonic spectrum and spreads the EMI over a continuous frequency range. Conventional systems use jitter by injecting noise into a gate drive or controller of the converter. Injecting noise into the gate drive of the converter has the disadvantage of distorting the output voltage signal. Further, injecting noise directly into a gate drive only applies jitter to the rising and falling edges of the converter switching signal. By injecting jitter directly into the gate drive circuit, conventional power converters inhibit the efficiency of feedback loop and other features including zero voltage switching and sampling of the switching signal.

Figure 1:
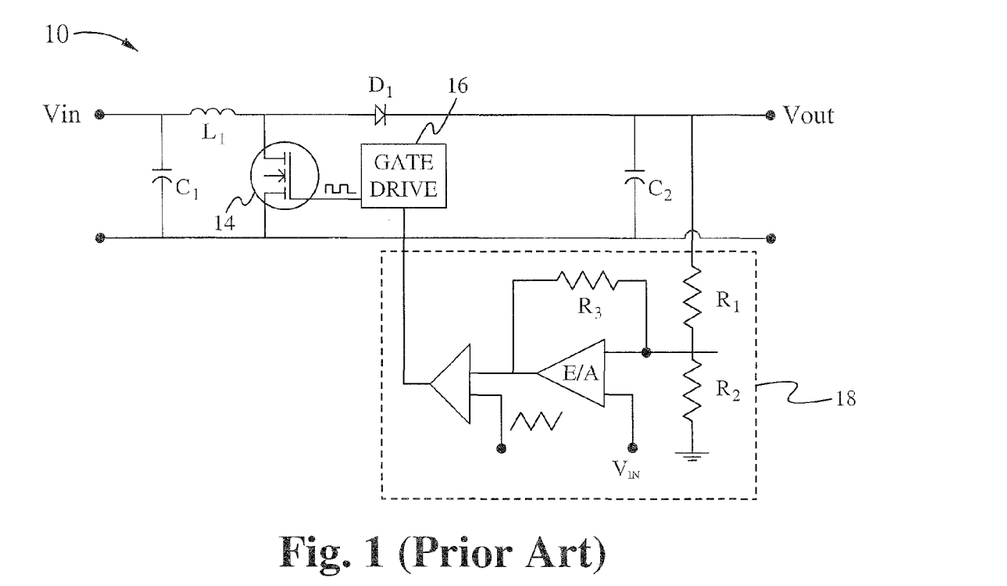
FIG. 1 illustrates a prior art schematic block diagram of a power supply apparatus.

A schematic diagram of a prior art regulated power supply 10 is shown in FIG. 1. The power supply 10 includes a converter circuit comprising a switch 14, a controller or gate drive 16 and a feedback circuit 18. The switch 14 is coupled with an output circuit comprising a rectifying diode D1 and an output capacitor C2. The power supply 10 includes a capacitor C1 and an inductor L1 coupled across an input voltage Vin. The gate drive 16 comprises a pulse width modulator (PWM) module that is coupled with a gate of the switch 14. The power supply 10 includes a voltage regulating circuit comprising the feedback circuit 18 and the gate drive 16. The gate drive 16 uses the PWM module to alter a duty cycle of the switch 14 depending on the feedback provided by the feedback circuit 18. The gate drive 16 accordingly adjusts the duty cycle of the switch 14 to compensate for any variances in an output voltage Vout. The power supply 10 limits EMI in the switch 14 by injecting jitter using a jitter mechanism within the gate drive 16. This jitter approach is plagued with the many disadvantages discuss above.

Accordingly, it is desirable to provide a regulated power supply with a jitter method and apparatus that is effective in substantially reducing EMI emission without the disadvantages of conventional systems.

SUMMARY OF THE INVENTION

In accordance with a first aspect of the present invention, a regulated power supply apparatus is provided. The regulated power supply apparatus includes a clock generator circuit configured for generating a clock signal at a predetermined frequency. An error amplifier is coupled with the clock generator circuit. The error amplifier includes a gain circuit coupled with the clock generator circuit. The error amplifier is configured to receive the clock signal at a switching element of the gain circuit. A controller circuit is configured for receiving a modulated error signal of the amplifier circuit. The controller circuit is configured for generating a pulse width modulated signal for controlling a duty cycle of the switching circuit. A switching circuit is configured for receiving the modulated error signal. The switching circuit is semiconductor switch. The error signal is modulated using the clock signal to vary a gain value of the gain circuit according to the predetermined frequency of the clock signal. An output circuit is coupled with the switching circuit. The output circuit is configured for generating a PWM regulated voltage signal. The controller circuit uses the modulated error signal to substantially reduce harmonic distortion in a switching frequency of the switching circuit. The controller circuit uses the modulated error signal to reduce harmonic distortion in the switching frequency of the switching circuit by 10 db or greater. [Is this the preferred quantifiable result?]

In an exemplary embodiment, the clock generator circuit is a logic circuit and generates a frequency in the range of 2 to 9 Khz. An enabling circuit is configured for enabling the clock generator circuit when the error signal is greater than or equal to a predetermined voltage value. The enabling circuit includes a latching diode coupled with an output node of the amplifier circuit and an enabling switch coupled between the latching diode and the clock generator circuit. A feedback input node of the amplifier circuit is configured for receiving the regulated voltage signal and a reference input node of the amplifier circuit is configured for receiving a reference voltage signal. The gain circuit includes a variable resistive network coupled between the output node and the feedback input node of the amplifier circuit. The variable resistive network includes a first resistor coupled in parallel with a series second resistor and the switching element. The variable resistive network also includes a capacitor coupled in series with the first resistor. The gain value of the gain circuit is a ratio of the resistance of the variable resistive network and an input resistive network coupled to the feedback input node. The amplifier circuit can be an operational amplifier. The amplifier circuit can be a feedback circuit for the switching circuit. The feedback circuit can provide a negative feedback loop.

In accordance with a second aspect of the present invention, a method of regulating a power supply apparatus is provided. The method includes injecting a clock signal into a gain circuit of an amplifier circuit. An error signal of the amplifier circuit is modulated using the clock signal to vary a gain value of the gain circuit according to a predetermined frequency of the clock signal. The modulated error signal is used to substantially reduce harmonic distortion in a switching frequency of a switching circuit. A controller circuit uses the modulated error signal to reduce harmonic distribution in the switching frequency of the switching circuit by 10.0 db or greater. The clock signal is generated at the predetermined frequency using a clock generator circuit. The clock generator circuit can be a logic circuit and can generate a clock signal in a frequency range of 2 to 9 Khz. The method also includes applying the modulated error signal to the controller circuit for the switching circuit and generating a pulse width modulated signal for controlling a duty cycle of the switching circuit. A regulated voltage signal is generated at an output circuit coupled with the switching circuit. The regulated voltage signal is applied to a feedback input node of the amplifier circuit and a reference voltage signal is applied to a reference input node of the amplifier circuit.

In an exemplary embodiment, the clock generator circuit is enabled when the error signal is greater than or equal to a predetermined voltage value using an enabling circuit. The clock signal is coupled to a switching element of the gain circuit. The gain circuit includes a variable resistive network coupled between an output node and the feedback input node of the amplifier circuit. The variable resistive network includes a first resistor coupled in parallel with a series second resistor and the switching element. The gain value of the gain circuit is a ratio of the resistance of the variable resistive network and an input resistive network coupled to the feedback input node. The amplifier circuit can be an operational amplifier and can be a feedback circuit for the switching circuit. The feedback circuit can be a negative feedback loop.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

The present invention provides a technique to reduce EMI emission without reduction of switching frequency. The present invention allows a switching frequency to be higher without exhibiting unwanted high harmonic distributions and further facilitates transferring the high harmonic distributions to a frequency range below the standard EMI bandwidth, which is less than 150 Khz, by applying low frequency modulation into a feedback loop. The low frequency modulation is injected into the feedback loop and effects the rising and falling edges of switching pulses of a switching circuit, thereby substantially reducing high harmonic distribution in a switching frequency of the switching circuit.

Figure 2:
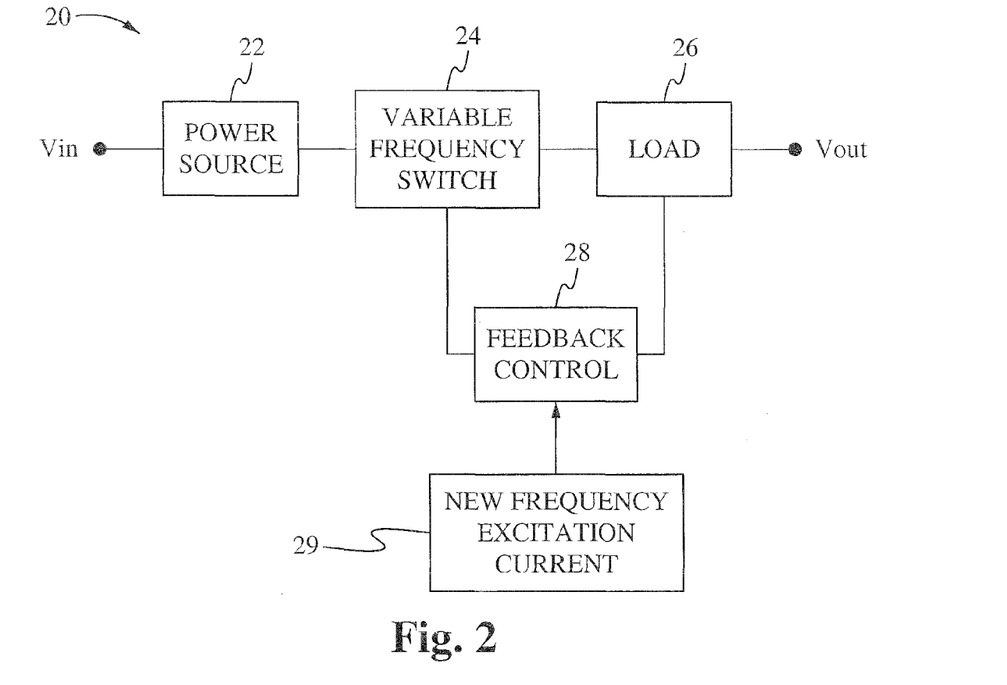
FIG. 2 illustrates a functional block diagram of a power supply apparatus in accordance with an embodiment of the invention.

Turning to FIG. 2, an exemplary functional block diagram is shown for a regulated power supply apparatus 10 according to an embodiment of the present invention. The apparatus 20 generally includes a power source 22, also known as an AC to DC converter coupled with an output power converting circuit or variable frequency switch 24. In some embodiments, the variable frequency switch 24 is part of a power converter circuit, such as a boost or a buck converter. The variable frequency switch 24 is coupled with an output or load circuit 26. A feedback control circuit 28 is coupled to the load circuit 26 and to the variable frequency switch 24. A new frequency excitation current circuit 29 is coupled with the feedback control circuit 28.

The power source 22 is coupled to receive an alternating current (AC) voltage Vac and to generate an unregulated direct current voltage coupled as an input of the variable frequency switch 24. In some embodiments, the feedback control circuit 28 operates the variable frequency switch 24 to maintain a constant output voltage Vout. The variable frequency switch 24 senses a power drop and a power increase in the output voltage Vout and controls a compensating frequency to correct the power increase or power drop in the output voltage Vout. The feedback control circuit 28 can prevent the output voltage Vout from exceeding a threshold by operating to decrease the frequency of the variable frequency switch 24. Conversely, the feedback control circuit 28 can prevent the output voltage Vout from falling below a threshold by operating to increase the frequency of the variable frequency switch 24. Electromagnetic interference (EMI) can be substantially diminished by operating the new frequency excitation current circuit 29 to vary a gain of the feedback control circuit 28 according to a low frequency modulated signal. The harmonic distribution can be reduced by 10.0 db or greater.

Figure 3A:
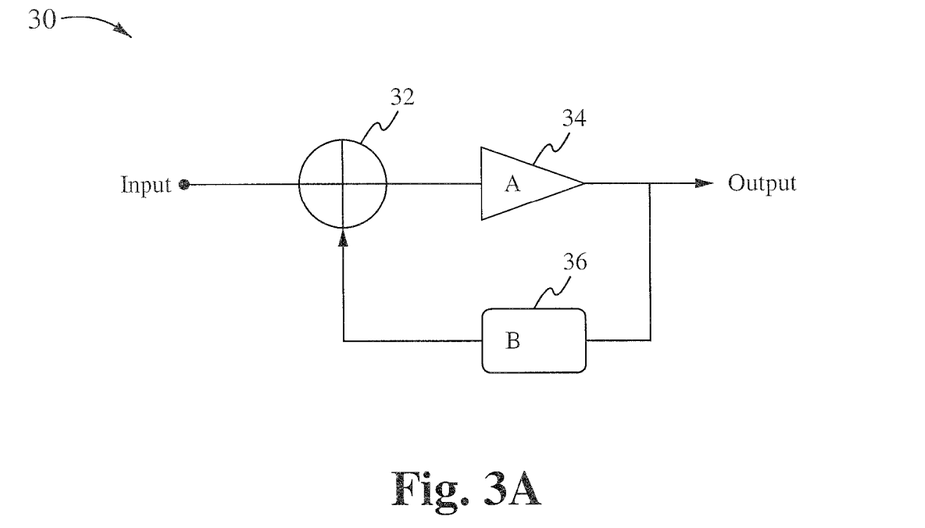
FIG. 3A illustrates a functional block diagram of a gain circuit of a power supply apparatus in accordance with an embodiment of the invention.

Turning to FIG. 3A, a functional block diagram is shown for a feedback loop apparatus 30 according to the present invention. The apparatus 30 generally includes an amplifier circuit 34 coupled with a gain circuit 36. The gain circuit has a bandwidth of 'B'. A summation circuit 32 is coupled with an input so that an input signal is summed with an output of the gain circuit 36. The output of the summation circuit 32 is a gain adjusted output signal of the amplifier circuit 34. In an exemplary embodiment, the output of the amplifier circuit 34 is a control signal for controlling an output frequency of a power supply switching element.

Figure 3B:
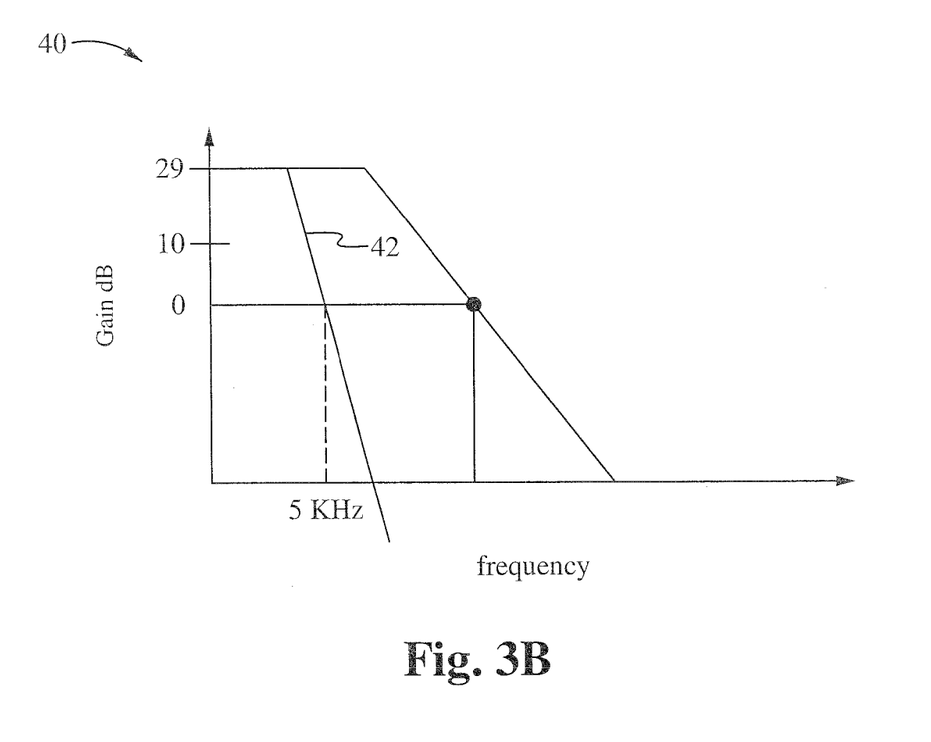
FIG. 3B illustrates a plot of a gain circuit of a power supply apparatus in accordance with an embodiment of the invention.

FIG. 3B illustrates a plot 40 of the feedback loop apparatus 30 according to an embodiment of the present invention. The plot 40 comprises gain versus frequency. The plot 40 includes signal 42 showing a positive gain for a frequency in the range of approximately 2 Khz to 5 Khz. The signal also shows a negative gain for frequencies in the range of 5 Khz to 9 Khz. Preferably, the apparatus is operated in the frequency range where the gain B is positive. [Is there greater significance to this graph than stated?]

Figure 4:
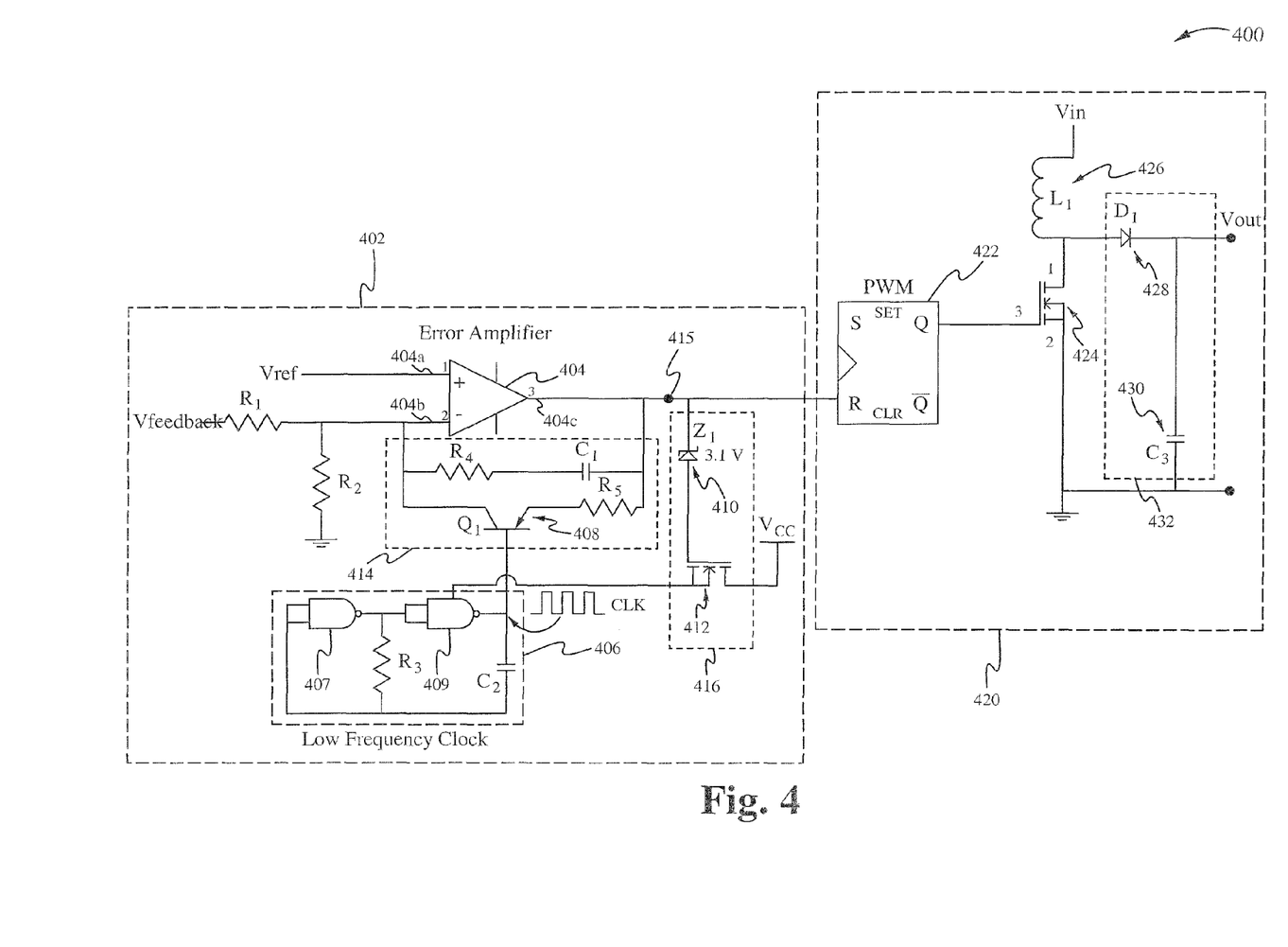
FIG. 4 illustrates a schematic diagram of a power supply apparatus in accordance with an embodiment of the invention.

Turning to FIG. 4, an exemplary schematic diagram is shown for a power supply apparatus 400 according to an embodiment of the present invention that comprises a more detailed version of the regulated power supply apparatus 10 described above. The apparatus 400 generally includes a converter circuit 420 coupled with a feedback system 402. The converter circuit 420 includes an output circuit 432 coupled with an output node Vout. The feedback system 402 is coupled between the converter circuit 420 and a feedback input node V feedback. The power supply apparatus 400 is configured to receive an unregulated DC voltage signal at an input node Vin and to provide a regulated output voltage Vout that is suitable for many low voltage appliances such as computer laptops, cell phones and other hand held devices. In an exemplary embodiment, the output voltage Vout can be set within the range 5-40 VDC. Alternatively, the power supply apparatus 400 can provide the output voltage Vout that is less than 5 VDC.

The converter circuit 420 is configured to receive the unregulated DC voltage signal Vin. In an exemplary embodiment, the converter circuit 420 comprises a variable frequency converter, such that an operating bandwidth of the converter circuit 420 can be adjusted depending on output power requirements of the converter circuit 420. The converter circuit 420 comprises a controller circuit 422, a switching circuit 424 and an output circuit 432. The controller circuit 422 comprises a pulse width modulation (PWM) circuit. The controller circuit 422 regulates the duty cycle of the switching circuit 424 with the PWM circuit. The output circuit 432 includes a rectifier diode 428 and an output capacitor 430. In an exemplary embodiment, the converter circuit 420 comprises a flyback converter. Alternatively, the converter circuit 420 can comprise one of a forward converter, a push-pull converter, a half-bridge converter and a full-bridge converter. In yet other alternatives, the converter circuit 420 can comprise other configurations of switch mode power supplies known to a person of ordinary skill in the art. The switching circuit 424 is coupled between the controller circuit 422 and the output circuit 432.

A first terminal of the switching circuit 424 is coupled with a first terminal of an inductor 426. A second terminal of the inductor 426 is coupled to the input node Vin. The first terminal of the switching circuit 424 is also coupled with an anode of the rectifier diode 428. A cathode of the rectifier diode 428 is coupled with the output node Vout. A first terminal of the output capacitor 430 is coupled with the cathode of the rectifier diode 428 and a second terminal of the output capacitor 430 is coupled with ground. A second terminal of the switching circuit 424 is coupled with ground. A third terminal of the switching circuit 424 is coupled with the controller circuit 422.

The output circuit 432 includes the rectifier diode 428 and the output capacitor 430. Alternatively, the output circuit 432 can include an output rectifier circuit comprising a half-wave rectifier. In still another embodiment, the output circuit 432 can include an output rectifier circuit comprising a full-wave rectifier.

The switching circuit 424 comprises a suitable switching device. In an exemplary embodiment, the switching circuit 424 comprises an n-type metal-oxide-semiconductor field-effect transistor (MOSFET) device. Alternatively, any other semiconductor switching device known to a person of skill in the art can be substituted for the switching circuit 424. The controller circuit 422 comprises a pulse width modulation (PWM) circuit. The controller circuit 422 regulates the duty cycle of the switching circuit 424 with the PWM circuit.

The feedback system 402 comprises a more detailed version of the feedback loop apparatus 30 described above. The feedback system 402 comprises an error amplifier 404, a gain circuit 414 coupled with the error amplifier 404, and a clock generator circuit 406 coupled with the error amplifier 404 via the gain circuit 414. The feedback system 402 further comprises an enabling circuit 416 coupled between the error amplifier 404 and the clock generator circuit 406. The feedback system 402 includes a reference voltage input node Vref coupled with a first terminal 404a of the error amplifier 404. A second terminal 404b of the error amplifier 404 is coupled with a first terminal of a resistor R1. A resistor R2 is coupled between the second terminal 404b of the error amplifier 404 and ground. A second terminal of the resistor R1 is coupled to the feedback input node V feedback. A third terminal 404c of the error amplifier 404 is coupled with an input of the controller circuit 422.

The gain circuit 414 is coupled between the second terminal and the third terminal of the error amplifier 404. The gain circuit 414 includes a first terminal of a resistor R4 coupled with the second terminal 404b of the error amplifier 404 and coupled with a first terminal of a switching element or transistor 408. A second terminal of the resistor R4 is coupled with a first terminal of a capacitor C1. A second terminal of the capacitor C1 is coupled with the third terminal 404c of the error amplifier 404 and coupled with a first terminal of the resistor R5. A second terminal of the resistor R5 is coupled with a second terminal of the transistor 408. A third terminal of the transistor 408 is coupled with the clock generator circuit 406.

The gain circuit 414 includes a variable resistive network comprising the resistors R4 and R5 coupled between an output node or the third terminal 404c and the second terminal 404b of the amplifier circuit 404. The resistance of the variable resistive network of the resistors R4 and R5 varies according to a duty cycle or switching frequency of the transistor 408. The turn-on of the transistor 408 changes the resistance of the variable resistive network R4, R5. A gain value of the gain circuit 414 comprises a ratio of the resistance of the variable resistive network R4 and R5 versus an input resistive network comprising the resistors R1 and R2. The varying resistance of the variable resistive network of the resistors R4 and R5 varies the gain value of the gain circuit 414 according to the switching frequency of the transistor 408. The transistor 408 can comprise any suitable type of transistor.

The clock generator circuit 406 includes an output of a first logic gate 407 coupled with an input of a second logic gate 409 and coupled with a first terminal of a resistor R3. An output of the second logic gate 409 is coupled with a first terminal of a capacitor C2 and coupled with the third terminal of the transistor 408 of the gain circuit 414. The input of the first logic gate 407 is coupled with a second terminal of the resistor R3. The second terminal of the resistor R3 is also coupled with a second terminal of the capacitor C2.

The clock generator circuit 406 is configured to generate the clock signal CLK at a predetermined frequency. The clock signal CLK is coupled to the transistor 408 of the gain circuit 414. In an exemplary embodiment, the clock generating circuit 406 operates at a predetermined frequency in the range of 2.0 to 9.0 KHz. In an alternative embodiment, the predetermined frequency is in a range of less than 2.0 KHz. In still another embodiment, the predetermined frequency is in a range of greater than 9.0 KHz. The clock generator circuit 406 is enabled when the error signal at the node 415 is greater than or equal to a predetermined voltage value, which triggers the enabling circuit 416. In an exemplary embodiment, the predetermined voltage value comprises 3.1 Vdc.

The enabling circuit 416 includes a first terminal of a latching or zener diode 410 coupled with the third terminal of the error amplifier circuit 404. A second terminal of the zener diode 410 is coupled with a third terminal of an enabling switch 412. A first terminal of the enabling switch 412 is coupled with a voltage source Vcc. A second terminal of the enabling switch 412 is coupled with the second logic gate 409. If an average voltage is above the predetermined voltage value at the node 415, then the latching diode 410 will turn on. The turn on of the latching diode 410 biases-on the enabling switch 412, which enables the clock generating circuit 406 to generate the clock signal CLK.

The enabling switch 412 comprises a suitable switching device. In an exemplary embodiment, the enabling switch 412 comprises an n-type metal-oxide-semiconductor field-effect transistor (MOSFET) device. Alternatively, any other semiconductor switching device known to a person of ordinary skill in the art can be substituted for the enabling switch 412.

The feedback system 402 comprises a feedback loop for providing a high switching frequency for the switching circuit 424 while substantially reducing high harmonic distribution in the switching frequency of the switching circuit 424. In an exemplary embodiment, the feedback system 402 comprises a negative feedback loop. The regulated voltage signal Vout that is generated at the output node Vout is applied to the feedback input node V feedback of the amplifier circuit 404 and a reference voltage signal Vref is applied to the reference input node 404a of the amplifier circuit 404. The amplifier circuit 404 generates an error signal containing jitter, in other words an error signal modulated according to clock signal CLK. The error signal containing jitter is generated by using the clock signal CLK to vary the gain value of the gain circuit according to the predetermined frequency of the clock signal CLK. The jitter essentially take spikes of EMI in the switching frequency of the switching circuit 424 and reduces and spreads out the EMI spikes over the frequency spectrum. The switching circuit 424 is configured for receiving the modulated error signal via the controller circuit 422. The controller circuit 422 circuit uses the modulated error signal in substantially reducing the high harmonic distribution in the switching frequency of the switching circuit 424. In an exemplary embodiment, the controller circuit 422 uses the modulated error signal to reduce harmonic distribution in the switching frequency of the switching circuit 424 by 10 db or greater. Thus, the output circuit 432 is configured for generating the regulated output voltage Vout where the high harmonic distribution in the switching frequency for the switching circuit 424 is substantially reduced.

Figure 5A:
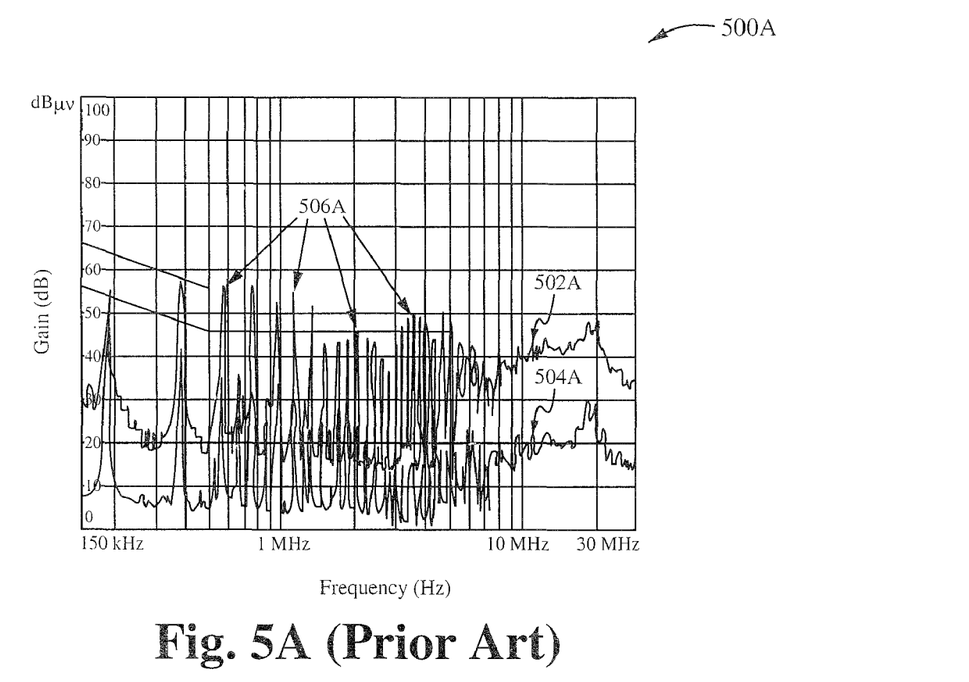
FIG. 5A illustrates a waveform diagram of a prior art power supply apparatus.
Figure 5B:
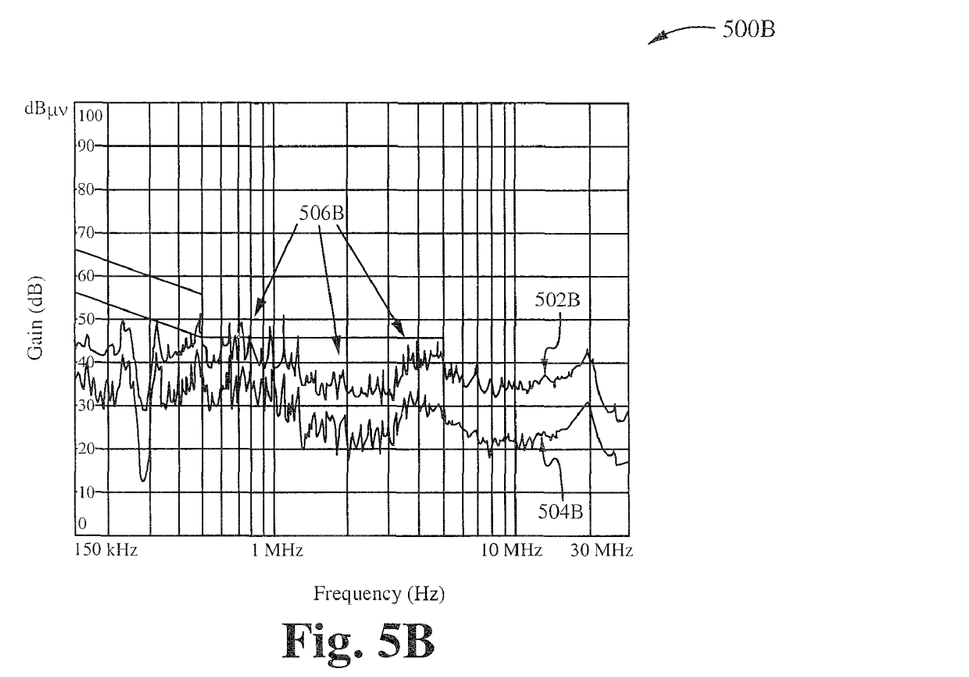
FIG. 5B illustrates a waveform diagram of a power supply apparatus in accordance with an embodiment of the invention.

Turning to FIGS. 5A and 5B, exemplary waveform diagrams 500A, 500B are shown for conventional and the power supply apparatus 400, respectively, in accordance with an embodiment of the present invention. FIG. 5A shows waveforms 502A, 504A of the conventional power supply apparatus without applying jitter according to the present invention. The waveforms 502A, 504A measure the signals of a 240 Vac live terminal. The waveforms 502A, 504A depict a gain (dB) versus a frequency (Hz). The waveforms 502A, 504A both show substantial EMI noise 506A between the operating range of 150 kHz to 10 MHz. FIG. 5B shows exemplary waveforms 502B, 504B of the power supply apparatus 400 applying jitter according to the present invention. The waveforms 502B, 504B measure the signals of a 240 Vac live terminal. The waveforms 502B, 504B depict a gain (dB) versus a frequency (Hz) of the power supply apparatus 400. The waveforms 502B, 504B both show a substantial reduction in EMI noise 506B between the operating range of 150 kHz to 10 MHz as compared to the conventional power supply apparatus waveforms 502A, 504A.

Figure 6A:
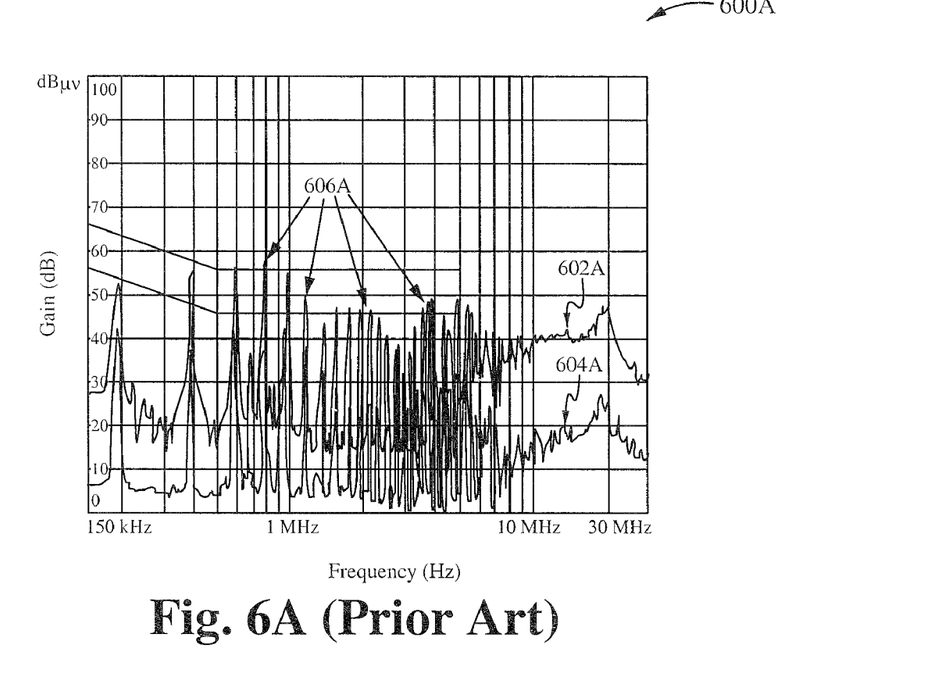
FIG. 6A illustrates another waveform diagram of a prior art power supply apparatus.
Figure 6B:
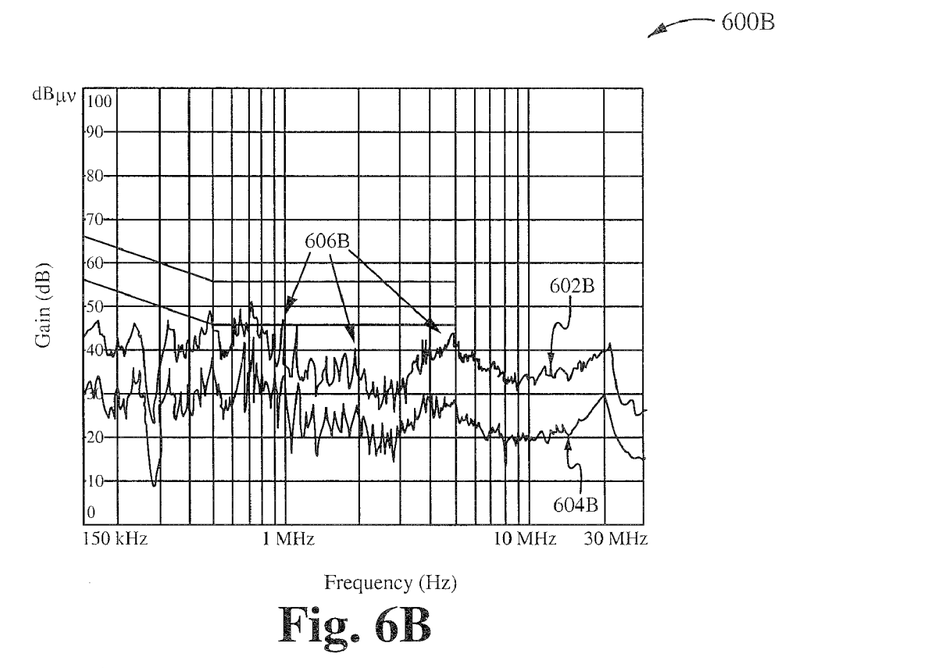
FIG. 6B illustrates another waveform diagram of a power supply apparatus in accordance with an embodiment of the invention.

Turning to FIGS. 6A and 6B, waveform diagrams 600A, 600B are shown for conventional and the power supply apparatus 400, respectively, in accordance with an embodiment of the present invention. FIG. 6A shows waveforms 602A, 604A of the conventional power supply apparatus without applying jitter according to the present invention. The waveforms 602A, 604A measure the signals of a 240 Vac neutral terminal. The waveforms 602A, 604A depict a gain (dB) versus a frequency (Hz). The waveforms 602A, 604A both show substantial EMI noise 606A between the operating range of 150 kHz to 10 MHz. FIG. 6B shows exemplary waveforms 602B, 604B of the power supply apparatus 400 applying jitter according to the present invention. The waveforms 602B, 604B measure the signals of a 240 Vac neutral terminal. The waveforms 602B, 604B depict a gain (dB) versus a frequency (Hz) of the power supply apparatus 400. The waveforms 602B, 604B both show a substantial reduction in EMI noise 606B between the operating range of 150 kHz to 10 MHz as compared to the conventional power supply apparatus waveforms 602A, 604A.

Figure 7:
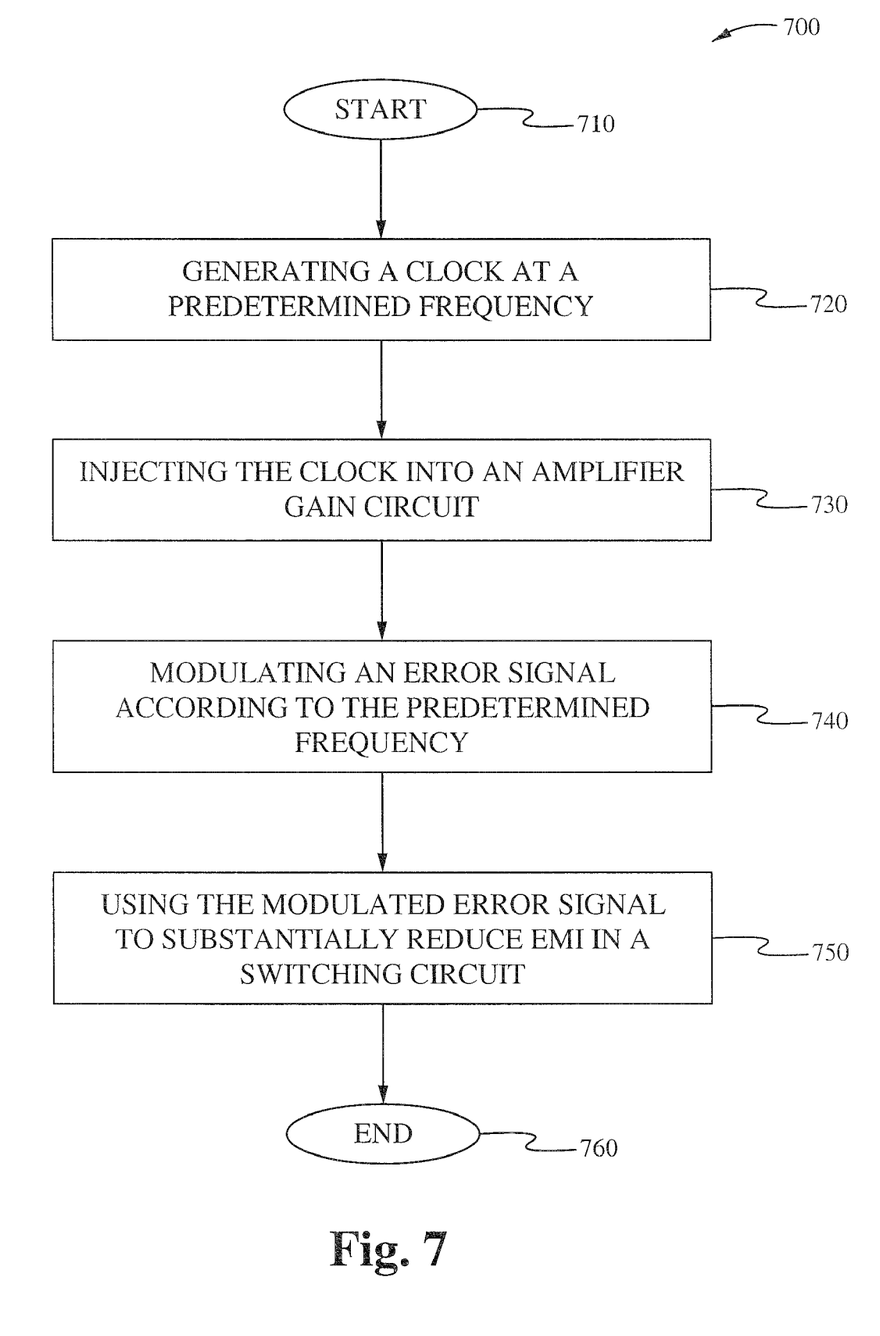
FIG. 7 illustrates a process flow diagram of a method of regulating a power supply apparatus in accordance with an embodiment of the invention.

Turning to FIG. 7, a process flow diagram is shown for a method of regulating the power supply apparatus 400 in accordance with an embodiment of the present invention. The process begins at the step 710. An unregulated DC voltage signal is received at the input node Vin. At the step 720, a clock signal CLK is generated at a predetermined frequency using the low frequency clock generating circuit 406. In an exemplary embodiment, the clock generating circuit 406 operates at a predetermined frequency in the range of 2.0 to 9.0 KHz. In an alternative embodiment, the predetermined frequency is in a range of less than 2.0 KHz. In still another embodiment, the predetermined frequency is in a range of greater than 9.0 KHz. The clock generator circuit 406 is enabled when the error signal at the node 415 is greater than or equal to a predetermined voltage value using the enabling circuit 416.

At the step 730, the clock signal CLK is injected into the gain circuit 414 of the amplifier circuit 404. The clock signal CLK is injected or coupled to the switching element or transistor 408 of the gain circuit 406. At the step 740, an error signal of the amplifier circuit is modulated using the clock signal CLK to vary the gain value of the gain circuit 414 according to the predetermined frequency of the clock signal CLK.

At the step 750, the modulated error signal is used to substantially reduce harmonic distribution or EMI in a switching frequency of the switching circuit 424. The clock signal CLK acts to spread or disperse harmonic distributions over the frequency spectrum as shown in FIG. 5B and FIG. 6B. The modulated error signal is applied to the controller circuit 422 of the switching circuit 424. The controller circuit 422 generates a pulse width modulated signal for controlling the duty cycle of the switching circuit 424. The regulated voltage signal Vout is generated at the output circuit 432 that is coupled with the switching circuit 424. The regulated voltage signal Vout is applied to the feedback input node V feedback of the amplifier circuit 404 and the reference voltage signal Vref is applied to a reference input node 404a of the an amplifier circuit 404. The feedback system 402 is responsive to changes in the regulated voltage signal Vout in maintaining the regulated voltage signal Vout at a constant value. The feedback system 402 is coupled with regulated voltage signal Vout via the feedback input node V feedback for sampling and providing the modulated error signal to the controller circuit 422. The controller circuit 422 maintains and thus regulates the voltage signal Vout by modifying the duty cycle of the switching circuit 424 according to the modulated error signal from the amplifier circuit 404. The method 700 ends at the step 760.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A regulated power control apparatus comprising a closed loop negative feedback system:
   a clock generator circuit configured for generating a clock signal at a predetermined frequency as a low frequency modulator;
   an amplifier circuit coupled with the clock generator circuit, wherein the amplifier circuit includes a modulated gain circuit coupled with the clock generator circuit, wherein the amplifier circuit is configured to receive the clock signal at a switching element of the modulated gain circuit;
   a controller circuit configured for receiving a modulated error signal of the amplifier circuit;
   a switching circuit configured for receiving the modulated error signal, wherein the error signal is modulated using the clock signal to vary a gain value of the gain circuit according to the predetermined frequency of the clock signal; and
   an output circuit coupled with the switching circuit, the output circuit configured for generating a regulated voltage signal, wherein the controller circuit uses the modulated error signal to substantially reduce harmonic distribution in a switching frequency of the switching circuit.

2. The apparatus of claim 1, wherein the controller circuit uses the modulated error signal to reduce harmonic distribution in the switching frequency of the switching circuit by 10 db or greater.

3. The apparatus of claim 1, wherein the clock generator circuit comprises a logic circuit.

4. The apparatus of claim 1, wherein the clock generator circuit comprises a frequency in the range of 2 to 9 Khz.

5. The apparatus of claim 1, further comprising an enabling circuit configured for enabling the clock generator circuit when the error signal is greater than or equal to a predetermined voltage value.

6. The apparatus of claim 5, wherein the enabling circuit comprises a latching diode coupled with an output node of the amplifier circuit and an enabling switch coupled between the latching diode and the clock generator circuit.

7. The apparatus of claim 1, wherein the controller circuit is configured for generating a pulse width modulated signal for controlling a duty cycle of the switching circuit.

8. The apparatus of claim 1, further comprising a feedback input node of the amplifier circuit configured for receiving the regulated voltage signal and a reference input node of the amplifier circuit configured for receiving a reference voltage signal.

9. The apparatus of claim 1, wherein the gain circuit comprises a variable resistive network coupled between the output node and the feedback input node of the amplifier circuit.

10. The apparatus of claim 9, wherein the variable resistive network comprises a first resistor coupled in parallel with a series second resistor and the switching element.

11. The apparatus of claim 10, further comprising a capacitor coupled in series with the first resistor.

12. The apparatus of claim 9, wherein the gain value of the gain circuit comprises a ratio of the resistance of the variable resistive network and an input resistive network coupled to the feedback input node.

13. The apparatus of claim 1, wherein the amplifier circuit comprises an operational amplifier.

14. The apparatus of claim 1, wherein the amplifier circuit comprises a feedback circuit for the switching circuit.

15. The apparatus of claim 14, wherein the feedback circuit comprises a negative feedback loop.

16. The apparatus of claim 1, wherein the switching circuit comprises a semiconductor switch.

17. A method of regulating a power supply apparatus comprising:
   generating a clock signal at a predetermined frequency;
   injecting the clock signal into a gain circuit of an amplifier circuit;
   modulating an error signal of the amplifier circuit using the clock signal to vary a gain value of the gain circuit according to the predetermined frequency of the clock signal; and
   using the modulated error signal to substantially reduce harmonic distribution in a switching frequency of a switching circuit.

18. The method of claim 17, wherein a controller circuit uses the modulated error signal to reduce harmonic distribution in the switching frequency of the switching circuit by 10.0 db or greater.

19. The method of claim 17, wherein the clock signal is generated using a clock generator circuit.

20. The method of claim 19, wherein the clock generator circuit comprises a logic circuit.

21. The method of claim 19, wherein the clock generator circuit comprises a frequency in the range of 2 to 9 Khz.

22. The method of claim 19, further comprising enabling the clock generator circuit when the error signal is greater than or equal to a predetermined voltage value using an enabling circuit.

23. The method of claim 17, further comprising:
   applying the modulated error signal to the controller circuit for the switching circuit; and
   generating a pulse width modulated signal for controlling a duty cycle of the switching circuit.

24. The method of claim 17, further comprising generating a regulated voltage signal at an output circuit coupled with the switching circuit.

25. The method of claim 24, further comprising applying the regulated voltage signal to a feedback input node of the amplifier circuit and applying a reference voltage signal to a reference input node of the amplifier circuit.

26. The method of claim 17, wherein the clock signal is coupled to a switching element of the gain circuit.

27. The method of claim 17, wherein the gain circuit comprises a variable resistive network coupled between an output node and the feedback input node of the amplifier circuit.

28. The method of claim 27, wherein the variable resistive network comprises a first resistor coupled in parallel with a series second resistor and the switching element.

29. The method of claim 27, wherein the gain value of the gain circuit comprises a ratio of the resistance of the variable resistive network and an input resistive network coupled to the feedback input node.

30. The method of claim 17, wherein the amplifier circuit comprises an operational amplifier.

31. The method of claim 17, wherein the amplifier circuit comprises a feedback circuit for the switching circuit.

32. The method of claim 31, wherein the feedback circuit comprises a negative feedback loop.

33. A method of regulating a power supply apparatus comprising:
   injecting a clock signal into a gain circuit of an amplifier circuit;
   modulating an error signal of the amplifier circuit using the clock signal to vary a gain value of the gain circuit according to a predetermined frequency of the clock signal; and
   using the modulated error signal to substantially reduce harmonic distribution in a switching frequency of a switching circuit.

34. The method of claim 33, wherein a controller circuit uses the modulated error signal to reduce harmonic distribution in the switching frequency of the switching circuit by 10.0 db or greater.

35. The method of claim 33, further comprising generating the clock signal at the predetermined frequency using a clock generator circuit.

36. The method of claim 35, wherein the clock generator circuit comprises a logic circuit.

37. The method of claim 35, wherein the clock generator circuit comprises a frequency in the range of 2 to 9 Khz.

38. The method of claim 35, further comprising enabling the clock generator circuit when the error signal is greater than or equal to a predetermined voltage value using an enabling circuit.

39. The method of claim 33, further comprising:
   applying the modulated error signal to the controller circuit for the switching circuit; and
   generating a pulse width modulated signal for controlling a duty cycle of the switching circuit.

40. The method of claim 33, further comprising generating a regulated voltage signal at an output circuit coupled with the switching circuit.

41. The method of claim 40, further comprising applying the regulated voltage signal to a feedback input node of the amplifier circuit and applying a reference voltage signal to a reference input node of the amplifier circuit.

42. The method of claim 33, wherein the clock signal is coupled to a switching element of the gain circuit.

43. The method of claim 33, wherein the gain circuit comprises a variable resistive network coupled between an output node and the feedback input node of the amplifier circuit.

44. The method of claim 43, wherein the variable resistive network comprises a first resistor coupled in parallel with a series second resistor and the switching element.

45. The method of claim 43, wherein the gain value of the gain circuit comprises a ratio of the resistance of the variable resistive network and an input resistive network coupled to the feedback input node.

46. The method of claim 33, wherein the amplifier circuit comprises an operational amplifier.

47. The method of claim 33, wherein the amplifier circuit comprises a feedback circuit for the switching circuit.

48. The method of claim 47, wherein the feedback circuit comprises a negative feedback loop.

\* \* \* \* \*